United States Patent
Fukuyama (10) Patent No.: US 9,606,923 B2
(45) Date of Patent: Mar. 28, 2017

(54) INFORMATION PROCESSING DEVICE WITH SHARED MEMORY, MEMORY ORDER GUARANTEE METHOD USING COUNTERS FENCE INSTRUCTIONS IN RELATION TO CACHE-ORIENTED REQUESTS, AND RECORDING MEDIUM STORING PROGRAM

(71) Applicant: NEC Corporation, Minato-ku, Tokyo (JP)

(72) Inventor: Tomohisa Fukuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/803,549

(22) Filed: Jul. 20, 2015

(65) Prior Publication Data

US 2016/0026571 A1    Jan. 28, 2016

(30) Foreign Application Priority Data

Jul. 24, 2014    (JP) .................................. 2014-150685

(51) Int. Cl.
*G06F 12/00* (2006.01)
*G06F 12/08* (2016.01)

(52) U.S. Cl.
CPC ........ *G06F 12/084* (2013.01); *G06F 12/0808* (2013.01); *G06F 2212/222* (2013.01); *G06F 2212/314* (2013.01); *G06F 2212/452* (2013.01); *G06F 2212/622* (2013.01); *G06F 2212/69* (2013.01)

(58) Field of Classification Search
CPC .. G06F 12/0811; G06F 9/522; G06F 12/0833;
G06F 12/0875; G06F 12/128; G06F 12/0238; G06F 12/084; G06F 2212/622; G06F 2212/452; G06F 2212/69;
(Continued)

(56) References Cited

U.S. PATENT DOCUMENTS

2004/0117564 A1* 6/2004 Grenholm ........... G06F 12/0815
711/150
2010/0042771 A1* 2/2010 Kawaguchi ......... G06F 12/0808
711/5

(Continued)

FOREIGN PATENT DOCUMENTS

JP    2000-181891 A    6/2000
JP    2010-044599 A    2/2010

*Primary Examiner* — Hong Kim (57) ABSTRACT

An information processing device includes a plurality of processors including an Acquire side processor and a Release side processor, and a shared memory. The Acquire side processor and the Release side processor includes a cache, a memory access control unit in the Release side processor configured to issue a StoreFence instruction for requesting a guarantee of completing the cache invalidation by the Acquire side processor, a memory access control unit in the Acquire side processor configured to issue a Load-Fence instruction in response to the StoreFence instruction for guaranteeing completion of the cache invalidation in accordance with the invalidation request from the shared memory after completing a process for the cache invalidation, and an invalidation request control unit configured to perform a process for invalidating the cache in accordance with the invalidation request from the shared memory.

6 Claims, 7 Drawing Sheets

(58) Field of Classification Search
CPC ......... G06F 2212/314; G06F 2212/222; G06F 12/0808
USPC .................. 711/118, 141, 147, 153, 135
See application file for complete search history.

(56) References Cited

U.S. PATENT DOCUMENTS

| | | | |
|---|---|---|---|
| 2013/0254488 A1* | 9/2013 | Kaxiras | G06F 12/0815 711/130 |
| 2014/0089591 A1* | 3/2014 | Moir | G06F 9/50 711/130 |
| 2014/0189256 A1* | 7/2014 | Kranich | G06F 9/526 711/147 |
| 2014/0282564 A1* | 9/2014 | Almog | G06F 9/522 718/102 |
| 2015/0286586 A1* | 10/2015 | Yadav | G06F 9/528 711/152 |

* cited by examiner

INFORMATION PROCESSING DEVICE WITH SHARED MEMORY, MEMORY ORDER GUARANTEE METHOD USING COUNTERS FENCE INSTRUCTIONS IN RELATION TO CACHE-ORIENTED REQUESTS, AND RECORDING MEDIUM STORING PROGRAM

This application is based upon and claims the benefit of priority from Japanese Patent Application No. 2014-150685, filed on Jul. 24, 2014, the disclosure of which is incorporated herein in its entirety by reference.

TECHNICAL FIELD

The present invention relates to an information processing device, a memory order guarantee method and a recording medium storing a program.

BACKGROUND ART

The memory order guarantee in a release consistency model means to guarantee the global visibility of data, that is, to guarantee completion of a process which is necessary for realizing consistency between data held by a shared memory and that by caches.

Specifically, in order to realize consistency between data held by a shared memory and that by caches (for example, in a multiprocessor system, no occurrence of inconsistency in data stored in a memory to and from which each processor writes and reads data, and the like), when a Store instruction to write data into the shared memory is executed, an invalidation request for requesting invalidation of the same data, as stored in the shared memory, is issued to the caches. By detecting a timing of completion of processing the issued invalidation request, the computer system concerned guarantees the global visibility.

Japanese Patent Application Laid-Open No. 2010-044599 discloses a memory order guarantee by means of a "Store Fence instruction" (hereafter, described as a StoreFence instruction) and a "Load Fence instruction" (hereafter, described as a LoadFence instruction). The StoreFence instruction is an instruction to designate a timing for providing synchronization of a Release side processor and an Acquire side processor. After the LoadFence instruction is issued, ordinality of data in the shared memory needs to be guaranteed. That is, consistency between the shared memory and the cache memories needs to be guaranteed.

Japanese Patent Application Laid-Open No. 2000-181891 discloses, in a multiprocessor system with a shared memory, a method for guaranteeing shared memory access order. The method does not need to cause execution of a subsequent Store instruction to wait with the purpose of guaranteeing the storing order.

In a release consistency model, there is no restriction on the processing order of cache invalidation requests. Accordingly, with respect to invalidation requests issued before a predetermined timing, a state where their processing has been entirely completed may be referred to as "memory order guarantee" or "guarantee of data ordinality".

Execution of an invalidation process at an Acquire side processor having received a corresponding invalidation request from the shared memory needs to be prior to that of the LoadFence instruction. If the invalidation process is executed later than the LoadFence instruction, data is read not from the shared memory but from the cache memory inside the Acquire side processor. As a result, it becomes possible that the data ordinality cannot be guaranteed.

By the way, Japanese Patent Application Laid-Open No. 2010-044599 does not describe any condition for executing the StoreFence instruction (described as a Release instruction in Japanese Patent Application Laid-Open No. 2010-044599). It is described there, however, that the Release side processor detects completion of a Store instruction through an Ack (acknowledgement) from the memory, and notifies the Acquire side processor of it by writing a flag. The Acquire side processor reads the flag by a Load instruction, subsequently broadcasts a LoadFence instruction to the whole memory banks and receives a reply with respect to it, and thereby guarantees completion of the invalidation request. On receiving the LoadFence instruction, the memory sends the processors all invalidation requests due to preceding Store instructions, and subsequently sends the Acquire side processor a reply with respect to the Load-Fence instruction. Accordingly, Japanese Patent Application Laid-Open No. 2010-044599 has the following problems. (a) It is possible that, at a memory bank, the LoadFence instruction waits for even an invalidation request essentially having no relation with the synchronization process. (b) It is possible that the LoadFence instruction and the invalidation requests place a load on the network between the processors and the memory, and this tendency becomes more remarkable with increasing the number of processors and that of memory banks.

Further, while Japanese Patent Application Laid-Open No. 2000-181891 performs a control not to allow a store request to overtake an invalidation request (purge request), it does not refer so far as to a timing of completion of processing the invalidation request.

SUMMARY

An exemplary object of the present invention is to solve the above-described problems, and accordingly to guarantee the global visibility of an invalidation request to an Acquire side processor.

An information processing device according to an exemplary aspect of the invention includes, a plurality of processors including an Acquire side processor intending to read data and a Release side processor intending to write data; and a shared memory, the Acquire side processor and the Release side processor including a cache, a memory access control unit configured to control access from the processors to the shared memory, the memory access control unit in the Release side processor, configured to comprise a store counter whose value is increased if a Store instruction is issued to the shared memory, and is decreased if an acknowledgement response indicating correct reception of the Store instruction is received from the shared memory, and a wait counter whose value is set at a value representing a predetermined time if the store counter has come to indicate 0, the wait counter decreasing the value at every predetermined interval, and the predetermined time being determined such that, compared to a time since the shared memory's sending the invalidation request until the Acquire side processor's completing the process for invalidating the cache, longer is a time taken totally by the shared memory's sending the acknowledgement response in response to the Store instruction from the Release side processor, the Release side processor's writing a flag into the shared memory the predetermined time later, and the Acquire side processor's reading the flag, and an invalidation request control unit configured to perform a process for invalidating the cache in accordance with the invalidation request from the shared memory, wherein, the shared memory sends an invalidation request to the Acquire side processor for invalidating a cash in the Acquire side processor, based on writing of data by the Release side processor, the memory access control unit in the Release side processor issues the StoreFence instruction if both of the store counter and the wait counter have come to indicate 0, and the memory access control unit in the Acquire side processor issues a LoadFence instruction in response to the StoreFence instruction for guaranteeing completion of the cache invalidation in accordance with the invalidation request from the shared memory after completing a process for the cache invalidation.

A memory order guarantee method according to an exemplary aspect of the invention includes, based on writing of data from a Release side processor intending to write data, sending, to an Acquire side processor intending to read data, an invalidation request for its cache, using a shared memory; issuing a StoreFence instruction, using the Release side processor, if both of a store counter and a wait counter have come to indicate 0; increasing the value of the store counter if a Store instruction is issued to the shared memory, and decreasing if an acknowledgement response indicating correct reception of the Store instruction is received from the shared memory; setting a value of the wait counter, the value representing a predetermined time if the store counter has come to indicate 0, and decreasing the value at the predetermined time, the predetermined time being determined such that, compared to a time since the shared memory's sending the invalidation request until the Acquire side processor's completing the process for invalidating the cache, longer is a time taken totally by the shared memory's sending the acknowledgement response in response to the Store instruction from the Release side processor, the Release side processor's writing a flag into the shared memory the predetermined time later, and the Acquire side processor's reading the flag; and in relation to the StoreFence instruction, by the Acquire side processor, issuing a LoadFence instruction for guaranteeing completion of the cache invalidation in accordance with the invalidation request from the shared memory, after completing a process for the cache invalidation.

A readable non-volatile recording medium storing a program according to an exemplary aspect of the invention causes a computer to execute: based on writing of data from a Release side processor intending to write data, sending, to an Acquire side processor intending to read data, an invalidation request for its cache, using a shared memory; issuing a StoreFence instruction, using the Release side processor, if both of a store counter and a wait counter have come to indicate 0; increasing the value of the store counter if a Store instruction is issued to the shared memory, and decreasing if an acknowledgement response indicating correct reception of the Store instruction is received from the shared memory; setting a value of the wait counter, the value representing a predetermined time if the store counter has come to indicate 0, and decreasing the value at the predetermined time, the predetermined time being determined such that, compared to a time since the shared memory's sending the invalidation request until the Acquire side processor's completing the process for invalidating the cache, longer is a time taken totally by the shared memory's sending the acknowledgement response in response to the Store instruction from the Release side processor, the Release side processor's writing a flag into the shared memory the predetermined time later, and the Acquire side processor's reading the flag; and in relation to the StoreFence instruction, by the Acquire side processor, issuing a LoadFence instruction for guaranteeing completion of the cache invalidation in accordance with the invalidation request from the shared memory, after completing a process for the cache invalidation.

BRIEF DESCRIPTION OF THE DRAWINGS

Exemplary features and advantages of the present invention will become apparent from the following detailed description when taken with the accompanying drawings in which.

EXEMPLARY EMBODIMENT

A first exemplary embodiment for implementing the present invention will be described in detail, with reference to drawings.

First, a description will be given of a release consistency model on which the present invention is based.

Figure 1:
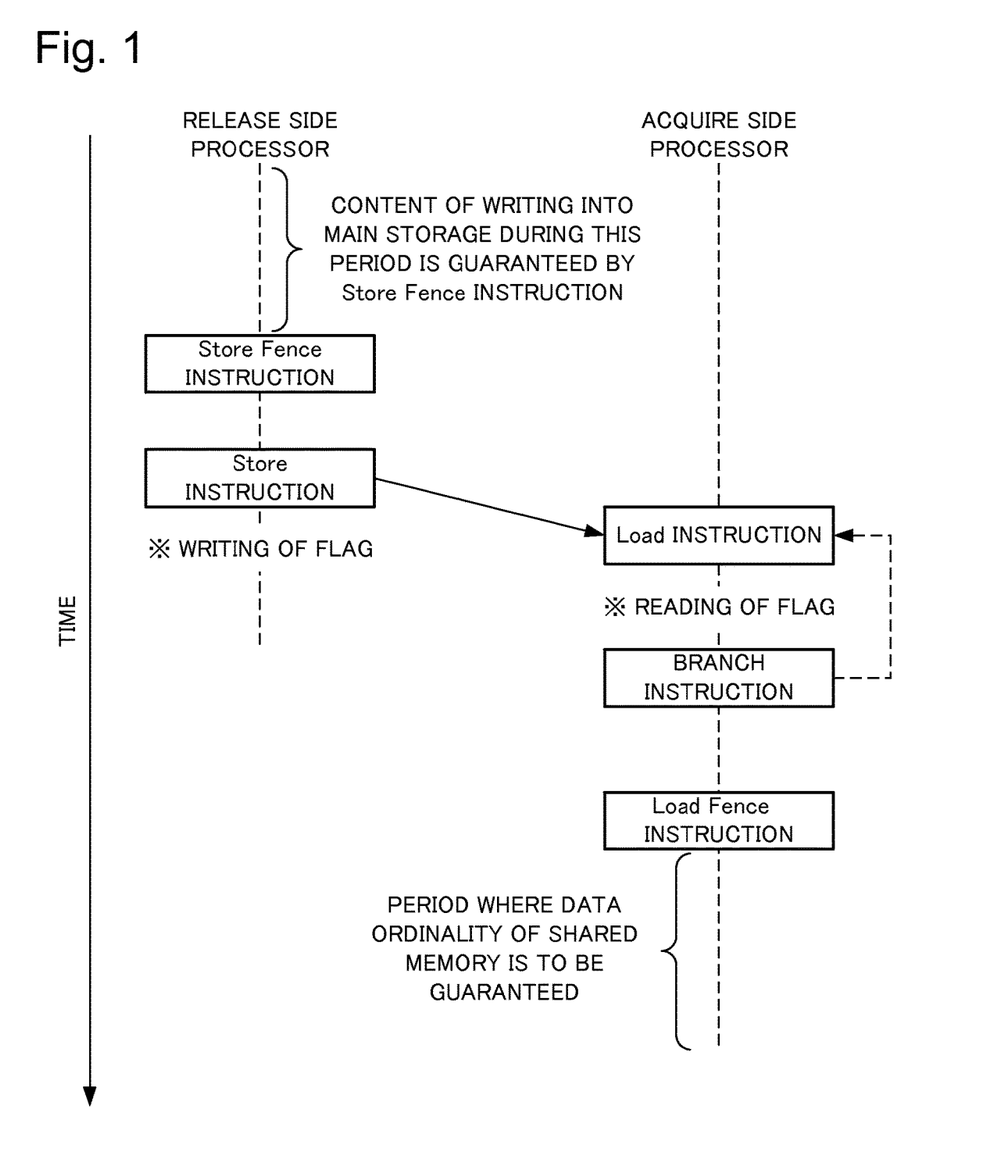
FIG. 1 is a diagram showing a memory order guarantee in a release consistency model.

FIG. 1 is a diagram showing an example of a memory order guarantee in the release consistency model.

The example shown in FIG. 1 concerns an information processing device assumed to include a shared memory and a plurality of processors each having a cache for data stored in the shared memory.

In FIG. 1, one of the plurality of processors in the consistency model is described as a Release side processor, and another one as an Acquire side processor. FIG. 1 illustrates a procedure for achieving synchronization between the Release side and Acquire side processors. In the synchronization procedure, the Release side processor executes a StoreFence instruction and writing of a flag by a Store instruction (Write instruction). The Acquire side processor reads the flag by a Load instruction, and subsequently executes a Branch instruction and a LoadFence instruction.

The StoreFence instruction is an instruction for designating a timing at which the Release side and Acquire side processors are to become in synchronization with each other. In other words, the StoreFence instruction is an instruction which, for the purpose of consistency between data stored in the shared memory and data stored in the cache of the Acquire side processor, requests guaranteeing completion of a process for invalidating the same data, as stored in the shared memory, stored in the caches. Therefore, it can be said that, for the Acquire side processor, a timing of its detecting the StoreFence instruction is that of its being requested to guarantee completion of a process for the data consistency.

In the release consistency model, visualization order of memory access instructions issued before execution of the StoreFence instruction is not necessarily guaranteed. That is, because invalidation requests issued in association with memory access instructions, for example, Store instructions, are processed independently in terms of respective banks, at what timing they are each processed is indefinite. Accordingly, it can be said that it is not guaranteed at what timing a result of executing each of the memory access instructions can be referred to from other processors.

Taking as a trigger its execution of the StoreFence instruction for performing synchronization and of the subsequent Store instruction, the Release side processor starts a process for guaranteeing completion of access to the shared memory prior to the StoreFence instruction.

Specifically, the Release side processor guarantees, by the StoreFence instruction, that any corresponding access instruction (in particular, Store instruction) to the shared memory has been completed, and by the subsequent Store instruction, it writes a predetermined flag into a predetermined area of the shared memory. On the other hand, the Acquire side processor performs a sequence to cause to wait (becomes in a wait state) by executing a Load instruction (Read instruction) for reading the flag having been written into the shared memory through the Store instruction and a Branch instruction, and to advance to the next process when the waiting state is completed. It is assumed that, concerning the flag, there is an agreement determined in advance between the Release side and Acquire side processors. The writing or reading area for the flag does not necessarily need to be in the shared memory, but may be in a register which is separately arranged for the synchronization.

On detecting the writing of the flag, the Acquire side processor issues a LoadFence instruction. After the issue of the LoadFence instruction, the Acquire side processor must guarantee ordinality of data stored in the shared memory. That is, consistency between the shared memory and the cache memory of the Acquire side processor must be guaranteed. Accordingly, as a precondition of a process in a time period after the issue of the LoadFence instruction (strictly, a time period after completion of processing the LoadFence instruction), it is required that invalidation requests issued before the issue of the StoreFence instruction are completed, and data ordinality of the shared memory is thus guaranteed.

In order to guarantee the data ordinality of the shared memory, the StoreFence and LoadFence instructions must realize the following three requirements.

(1) The StoreFence instruction guarantees completion of any Store instruction prior to it.

(2) No Load instruction subsequent to the LoadFence instruction is speculatively executed. That is, the LoadFence instruction must prevent any access to the shared memory before completion of the waiting.

(3) At a time of completing the LoadFence instruction, the Acquire side processor guarantees completion of any invalidation request to the Acquire side processor due to a Store instruction prior to the StoreFence instruction.

The function of (2) can usually be realized within the processor by prohibiting any Load instruction from overtaking the LoadFence instruction, and therefore, it will not be described here.

As already described above, in the release consistency model, the order of completing invalidation requests must be guaranteed at a time of completion of the LoadFence instruction corresponding to the synchronization process. That is, it is required that processing of all invalidation requests issued before the issue of the StoreFence instruction has been wholly completed at that time.

Accordingly, required is some sort of mechanism for guaranteeing that all of invalidation requests due to Store instructions prior to the StoreFence instruction have been completed at a time of completion of the LoadFence instruction. In the following exemplary embodiment, a description will be given of such a mechanism for guaranteeing completion of cache invalidation requests.

Figure 2:
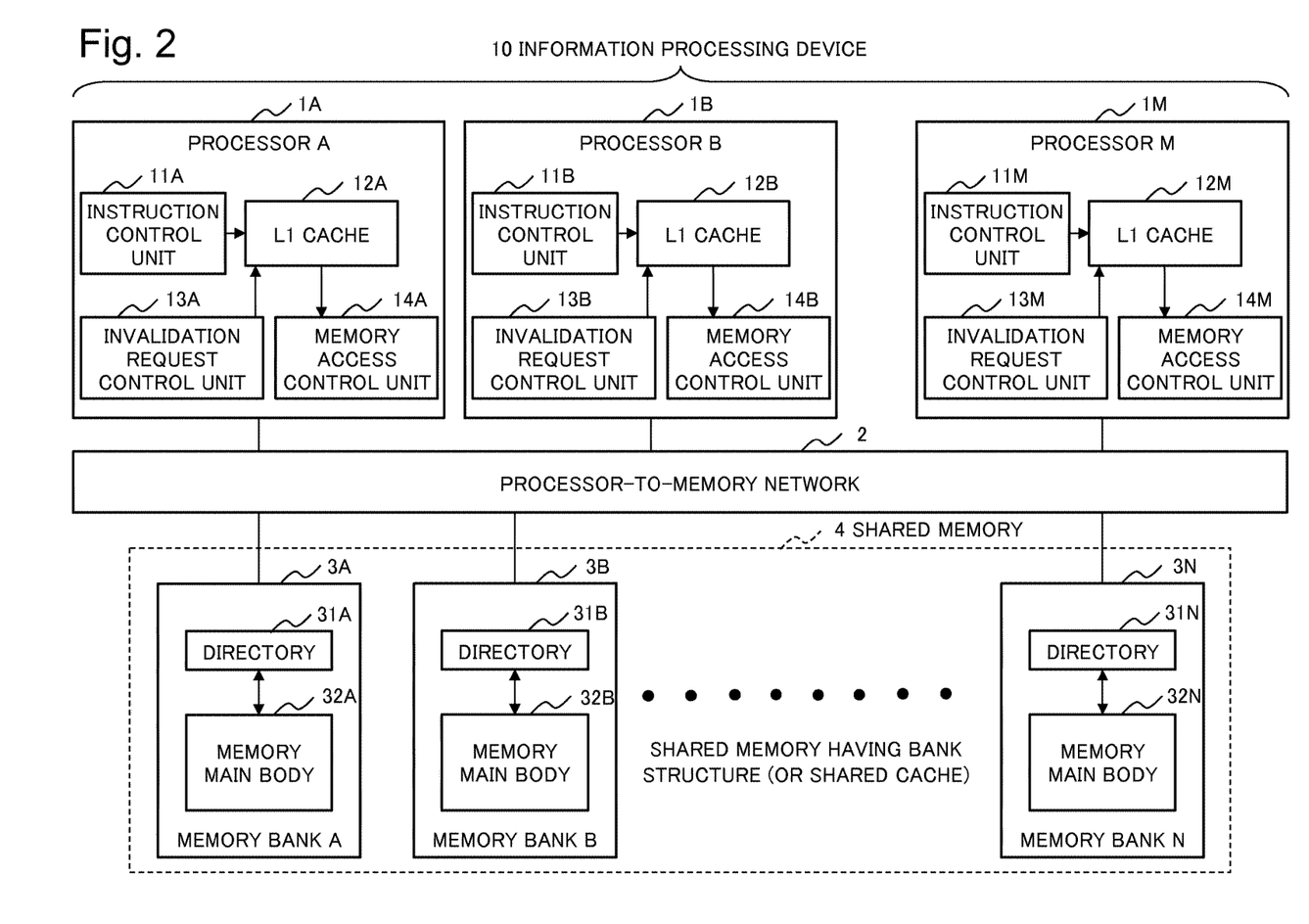
FIG. 2 is a block diagram showing an example of a configuration of an information processing device according to a first exemplary embodiment of the present invention.

FIG. 2 is a block diagram showing an example of a configuration of an information processing device 10 according to the first exemplary embodiment of the present invention.

Referring to FIG. 2, the information processing device 10 includes a plurality of processors 1 (1A to 1M), a shared memory 4 consisting of a plurality of memory banks 3 (3A to 3N), and a processor-to-memory network 2 connecting the processors 1 with the shared memory 4. Hereafter, "processor 1" represents any one of the processors 1A, 1B ... and 1M (1A to 1M), and "memory bank 3" represents any one of the memory banks 3A, 3B ... and 3N (3A to 3N). The present rule of assigning a reference sign to each constituent element is as follows. For a reference sign of each constituent element of the processor 1, one of the alphabets A to M used for the reference sign of the processor 1 is also used. For a reference sign of each constituent element of the memory bank 3, one of the alphabets A to N used for the reference sign of the memory bank 3 is also used. When a constituent element is expressed by only a number accompanied by no alphabet, the constituent element represents any one of the identical constituent elements to which different alphabets are assigned.

What described here as a "shared memory" may also be a shared cache. The shared cache includes an on-chip cache shared among processors in a recent multi-core configuration.

First, the processor 1 will be described. The processor 1 includes an instruction control unit 11, an L1 (Level 1) cash 12, an invalidation request control unit 13 and a memory access control unit 14.

The instruction control unit 11 controls instructions. The instruction control unit 11 has a function to prevent speculative execution of a Load instruction subsequent to a LoadFence instruction.

The L1 cache 12 is a level-1 cache arranged with respect to each processor 1 or each processor core.

When a Store instruction to the shared memory 4 is issued from another processor 1, if the own processor 1 holds the same cache line, an invalidation request for the cache line is issued from the shared memory 4. The invalidation request control unit 13 of the processor 1 has a function to receive the invalidation request and accordingly invalidate the L1 cache 12.

The memory access control unit 14 has a function to control issue of a memory access instruction (for example, the Store instruction) to the shared memory 4 from the own processor 1. Further, the memory access control unit 14 comprises a store counter and a wait counter, and has a function to prevent, on detecting a StoreFence instruction, execution of any subsequent Store instruction until the values of two counters becomes "0".

The processor-to-memory network 2 is a mechanism for connecting the processor 1 with the shared memory 4, where no restriction is placed on the connection form.

Next, the memory bank 3 will be described. The memory bank 3 is a bank type memory to constitute the shared memory 4, and each memory bank 3 (3A to 3N) includes a directory 31 (31A to 31N) and a memory main body 32 (32A to 32N).

The directory 31 has a function to perform centralized control of consistency between the L1 cache 12 and the shared memory 4. The directory 31 has also a function to issue an invalidation request to a processor 1 having an L1 cache 12 to be invalidated, in association with writing of data into the memory main body 32, if the invalidation of the L1 cache 12 is determined to be necessary at that time.

The memory main body 32 is a general memory used in computer systems.

Here, the instruction control unit 11, the invalidation request control unit 13 and the memory access control unit 14 are constituted by, for example, a hardware circuit such as a logic circuit.

The shared memory 4 (each memory bank 3) is constituted by, for example, a storage device such as a disk device and a semiconductor memory.

The information processing device 10 may be realized by a computer device. In that case, the instruction control unit 11, the invalidation request control unit 13 and the memory access control unit 14 may be realized by execution of a program stored in a memory, not illustrated in the diagram, by a processor of the information processing device 10 corresponding to the computer device. The program may be stored in a non-volatile memory.

Figure 3:
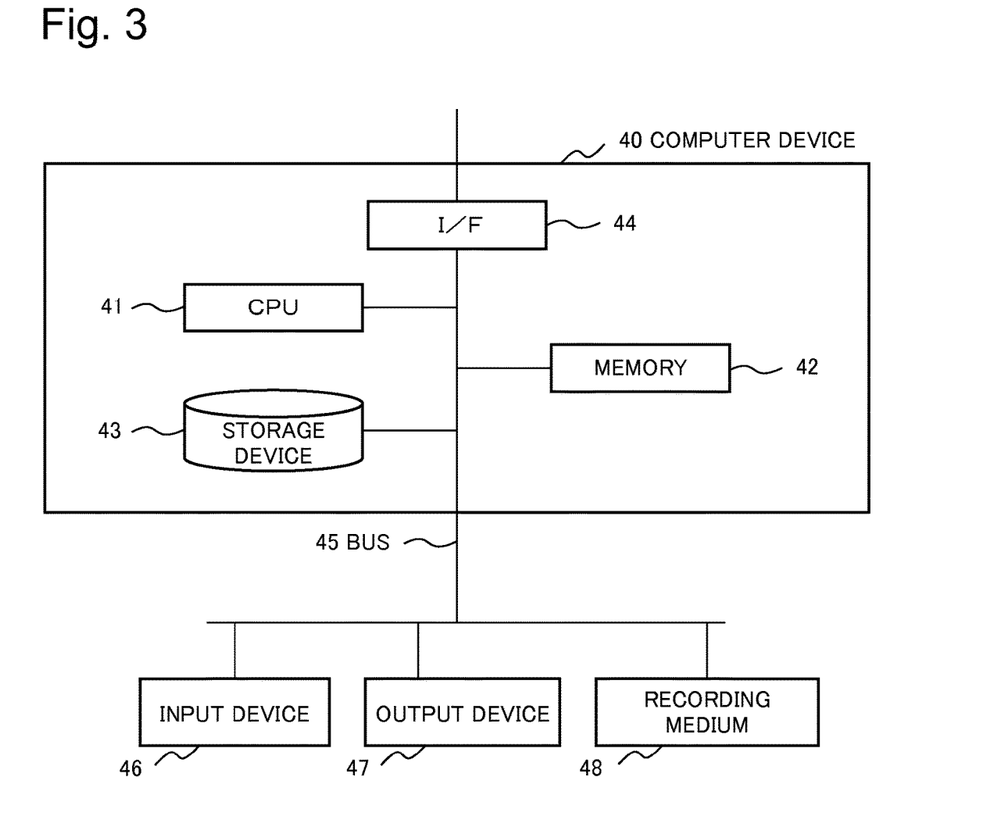
FIG. 3 is a block diagram showing a hardware circuit to realize the information processing device according to the first exemplary embodiment of the present invention by the use of a computer.

FIG. 3 is a block diagram showing a hardware circuit in which the information processing device 10 is realized by a computer device 40.

As shown in FIG. 3, the computer device 40 includes a CPU (Central Processor Unit) 41, a memory 42, a storage device 43 for storing a program, such as a hard disk, and an I/F (Interface) 44 for network connection. The computer device 40 is connected to an input device 46 and an output device 47 via a bus 45.

The CPU 41 causes an operating system to work and thereby controls the whole computer device 40. The CPU 41 may read a program and data from a recording medium 48 mounted in a drive device, for example, and store them into the memory 42. The CPU 41 functions as part of the instruction control unit 11, invalidation request control unit 13 and memory access control unit 14 in the information processing device 10 shown in FIG. 2, and executes various processes according to the program. The CPU 41 may consist of a plurality of CPUs. The plurality of CPUs may be the processors 1A to 1M.

The storage device 43 is, for example, an optical disk, a flexible disk, a magneto-optical disk, an external hard disk, a semiconductor memory or the like. The recording medium 48 is a non-volatile storage device, in which a program to be executed by the CPU 41 is recorded. The recording medium 48 may be a part of the storage device 43. The program may be downloaded via the I/F 44 from an external computer, not illustrated in the diagram, which is connected to the communication network. The storage device 43 and the memory 42 may be the ones constituting the shared memory 4.

The input device 46 is realized by, for example, a mouse, a keyboard, built-in key buttons or the like, and is used for input operation. The input device 46 is not limited to those devices, but may also be, for example, a touch panel. The output device 47 is realized by a display, for example, and is used for checking the output.

As has been described above, the computer device 40 corresponding to the information processing device 10 of the first exemplary embodiment shown in FIG. 2 is realized by the hardware configuration shown in FIG. 3. However, a configuration of the computer device 40 is not limited to that of FIG. 3. For example, the input device 46 and the output device 47 may be the ones installed outside and connected via the interface 44.

Further, the computer device 40 may be realized by a physically integrated single device, or by physically separated two or more devices which are connected with each other by wire or wireless.

Figure 4:
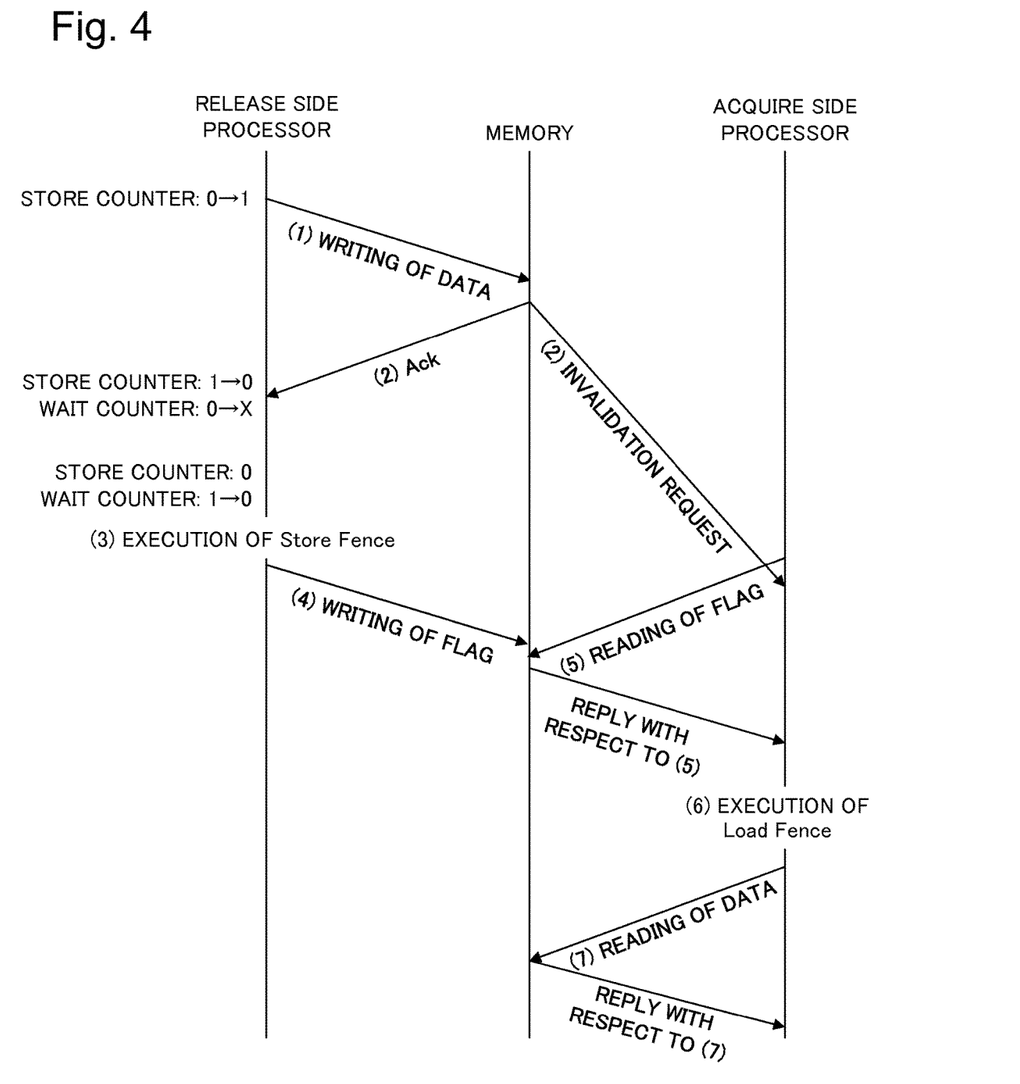
FIG. 4 is a time chart showing an example of operation of the information processing device according to the first exemplary embodiment of the present invention.

FIG. 4 is a time chart showing an example of operation of the information processing device 10.

FIG. 4 illustrates, in chronological order, operation of the processor 1 on the Release side (hereafter, described as the Release side processor), the processor 1 on the Acquire side (hereafter, described as the Acquire side processor) and the shared memory 4 (hereafter, described as the memory).

Before describing the time chart, functions of counters will be briefly described. In the present exemplary embodiment, the memory access control unit 14 of each processor 1 comprises two kinds of counters for synchronization, that is, a store counter and a wait counter. It is assumed that a dedicated signal line, for example, is used for an invalidation request from the memory to each processor, and a maximum value of a time taken by the invalidation process is thereby guaranteed.

While the following description will be given by taking "+1" and "−1" as examples of increments in, respectively, adding and subtracting operations performed in each of the counters, it is assumed that any values may be set as the increments.

The store counter counts up its value by "+1" every time the memory access control unit 14 issues a Store instruction to the memory, and counts up by "−1" (counts down by "1") on receiving an Ack (Acknowledge) from the memory. After receiving the Store instruction, at a time when reflection of the store data to the memory has become certain, that is, when it has been determined that no overtake by any subsequent instruction may occur, the memory sends back an Ack to the processor having sent the Store instruction. When the value of the store counter is "0", it indicates that all Store instructions issued by the processor 1 have already been completed.

When the store counter's value has changed from "1" to "0", the wait counter sets its value at a predetermined one (a value determined in advance) and, since that time until its counter value becomes "0", increases its value by "−1" at every one cycle corresponding to a predetermined unit of time. If the store counter's value has changed from "1" to "0" again before the wait counter's value becomes "0", the wait counter sets its value at the predetermined one again. The predetermined value to be set to the wait counter will be described later.

On detecting a StoreFence instruction, the Release side processor waits until both of the store and wait counters come to indicate "0", and prevents the issue of any subsequent Store instruction to the memory. As a result, the Acquire side processor guarantees that the processing of the invalidation request is completed before executing a Load-Fence instruction.

Hereinafter, using the time chart of FIG. 4, operation of the information processing device 10 will be described in chronological order. It is assumed that process steps (1) to (7) in the following description correspond to, respectively, (1) to (7) in FIG. 4. It is also assumed that operation of the Release side processor described below represents operation of the memory access control unit 14 or the invalidation request control unit 13 of a corresponding processor 1 (for example, the processor 1A). It is similarly assumed that operation of the Acquire side processor described below represents operation of the memory access control unit 14 or the invalidation request control unit 13 of a corresponding processor 1 (for example, the processor 1B). It is further assumed that operation of the memory in the following process steps represents operation of the shared memory 4.

(1) The Release side processor issues a Store instruction to the memory. Then, the Release side processor causes its store counter to change by "+1".

(2) At a time when reflection of the store data to the memory has become certain, the memory sends an Ack (Acknowledge) to the sender of the Store instruction. At the same time, the memory sends an invalidation request to an Acquire side processor holding data cached from the same address as that to which the Store instruction is directed. On receiving the Ack, the Release side processor causes its store counter to change by "−1". If the store counter's value has become "0", the Release side processor sets its wait counter's value at a value "X". Since then, the Release side processor causes the wait counter to change by "−1" at every one cycle.

(3) If detecting a StoreFence instruction, the Release side processor waits until both of its store and wait counters come to indicate "0".

(4) If both of the store and wait counters have come to indicate "0", the Release side processor writes a flag when issuing a subsequent Store instruction.

(5) The Acquire side processor reads the flag written in (4).

(6) The Acquire side processor executes a LoadFence instruction.

(7) The Acquire side processor reads, by a Load instruction, the store data written by the Store instruction in (1).

Here, the sending of an invalidation request from the memory in (2) and an invalidation process performed by the Acquire side processor having received the invalidation request must be prior to the execution of a LoadFence instruction in (6). If they are performed later than the LoadFence instruction, the data reading in (7) is performed not on data stored in the memory but on that stored in the cache memory inside the Acquire side processor. As a result, the data ordinality becomes unable to be guaranteed.

Therefore, the value X, which is a value expressing a predetermined time and is set to the wait counter when the store counter has changed from "1" to "0", is determined to be a value X which always satisfies the following expression.

(a time since the memory's sending an invalidation request in (2) until the Acquire side processor's completing invalidation of its cache)<(a time taken totally by the memory's sending an Ack in (2), the Release side processor's writing a flag in (4) and the Acquire side processor's reading the flags in (5))+X It is expressed as the following equation (1).

X=(the maximum of a time taken by the invalidation process)−(the minimum of a time taken totally by (2),(3) and (4))    equation (1)

Next, the operation of the information processing device 10 shown in FIG. 2 will be described using flow charts shown in FIGS. 5 and 6.

Figure 5:
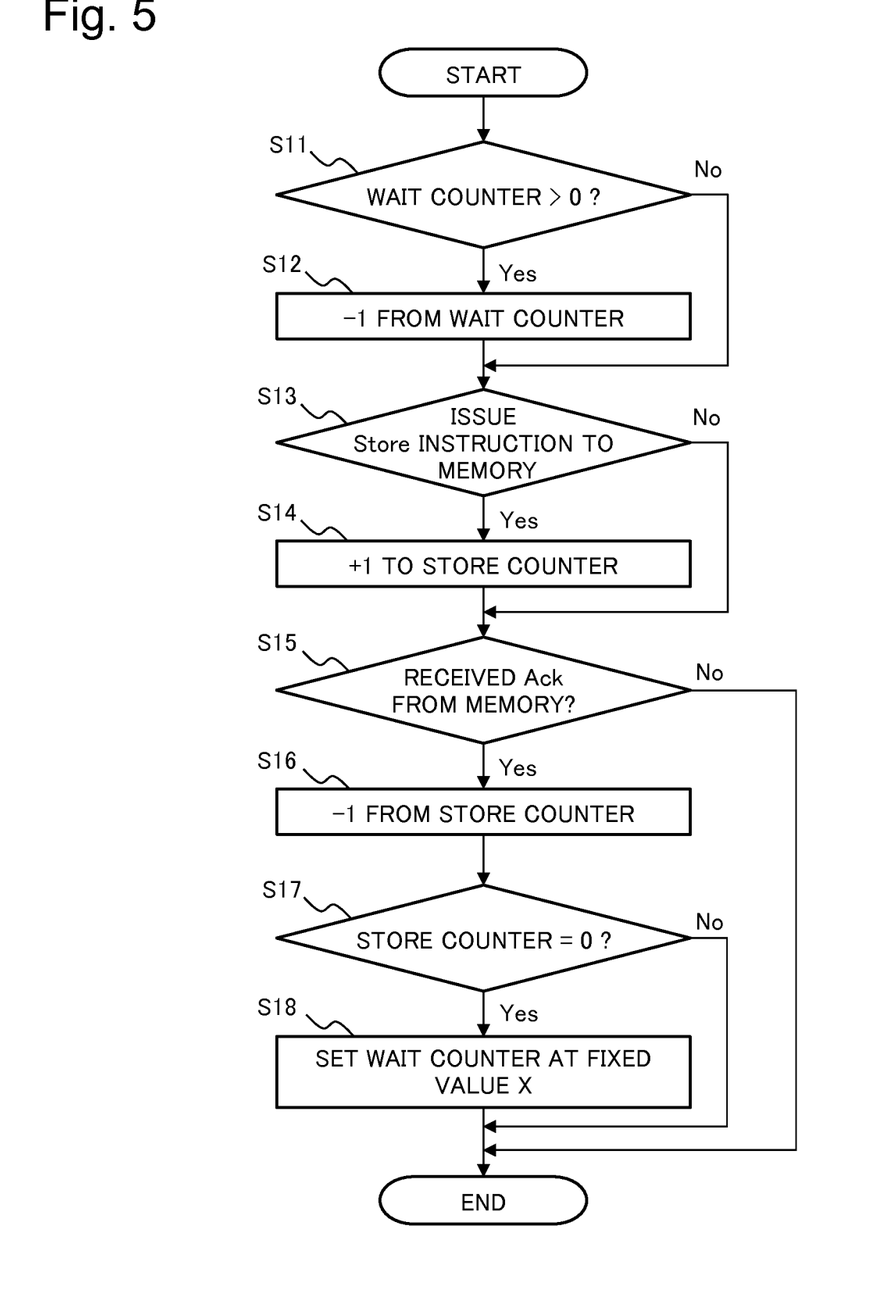
FIG. 5 is a flow chart showing operation of a store counter and that of a wait counter in a memory access control unit of a Release side processor, according to the first exemplary embodiment of the present invention.

FIG. 5 is a flow chart showing operation of the store and wait counters in the memory access control unit 14 of the Release side processor.

Here, operation of the Acquire side processor includes only that by the instruction control unit 11 for preventing a speculative Load instruction subsequent to the LoadFence instruction. Operation of the memory bank 3 (the shared memory 4) includes only that for searching for an Ack and searching the directory 31 and accordingly sending an invalidation request, at the time of executing the Store instruction. Accordingly, these operations are conventional processes, and therefore, their descriptions using a flow chart will not be given here.

First, if its wait counter indicates a value larger than "0" (YES at a step S11), the memory access control unit 14 changes the value of the wait counter by "−1" (step S12).

Next, when having issued a Store instruction to the memory (YES at a step S13), the memory access control unit 14 changes the value of its store counter by "+1" (step S14).

If receiving an Ack from the memory (YES at a step S15), the memory access control unit 14 changes the value of the store counter by "−1" (step S16) and, further, if the value of the store counter has become "0" (step S17), it sets a fixed number "X" to the wait counter (step S18).

The above operations are performed once a cycle, and accordingly, the value of the wait counter is changed by "−1" at every one cycle.

Figure 6:
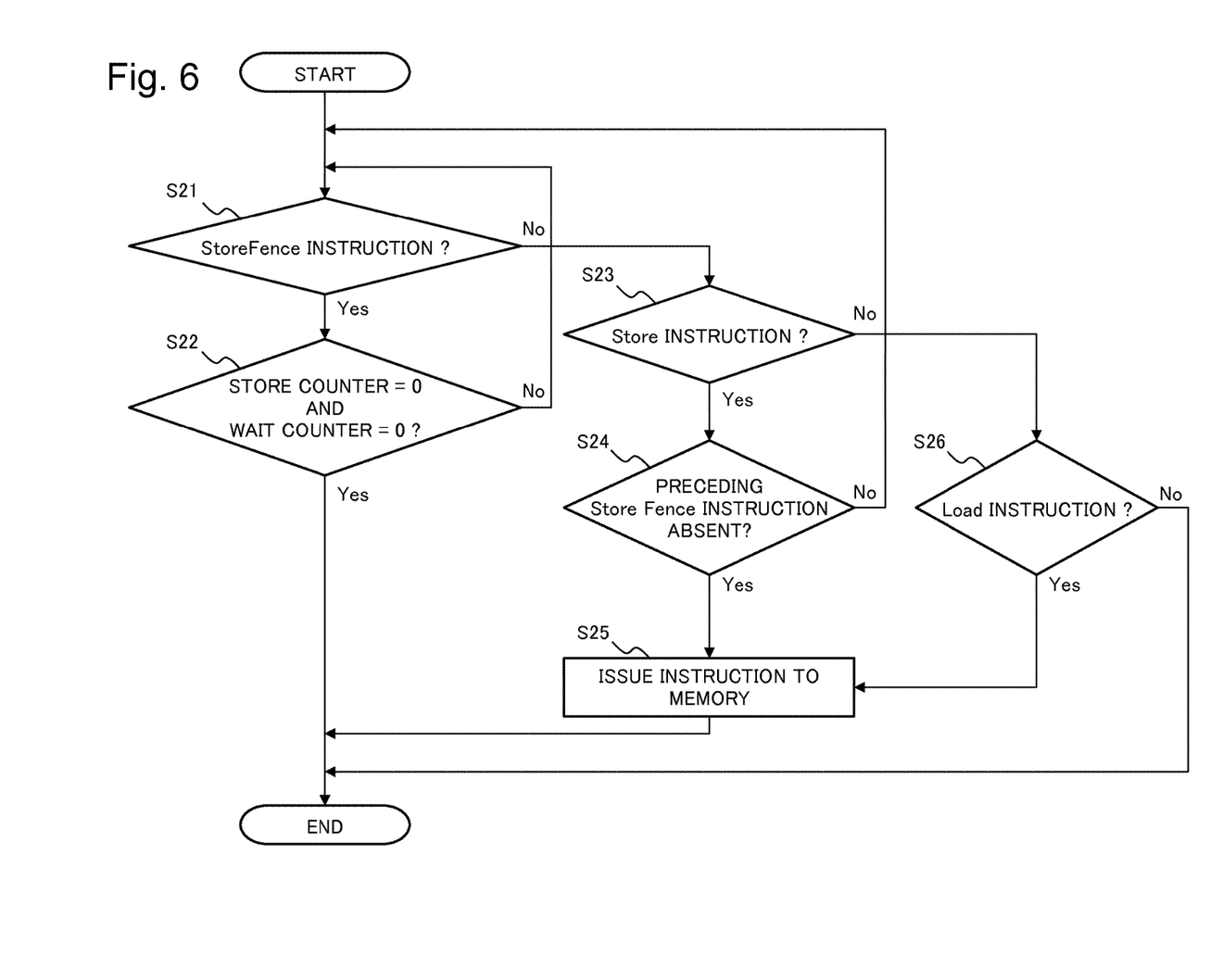
FIG. 6 is a flow chart showing operation for instruction processing in the information processing device according to the first exemplary embodiment of the present invention.

FIG. 6 is a flow chart showing operation for processing instructions in the information processing device 10.

First, if an instruction detected by the memory access control unit 14 is a StoreFence instruction (YES at a step S21), and at the same time, if both of the store and wait counters indicate "0" (YES at a step S22), the processing of the StoreFence instruction ends. However, if either of the store and wait counters indicates a value larger than "0" (NO at the step S22), the memory access control unit 14 returns to the step S21 and performs the same process also in the next cycle.

Since then until both of the store and wait counters come to indicate "0" and the processing of the StoreFence instruction accordingly ends, the memory access control unit 14 repeats the same operation.

If an instruction detected by the memory access control unit 14 is a Store instruction (NO at the step S21, and YES at a step S23), and at the same time, if there is no StoreFence instruction whose processing by the memory access control unit 14 has not been finished yet (YES at a step S24), the memory access control unit 14 issues the Store instruction to the processor-to-memory network 2 (step S25), by which the processing of the Store instruction ends.

However, if there is any StoreFence instruction whose processing by the memory access control unit 14 has not been finished yet (NO at the step S24), the memory access control unit 14 returns to the step S21.

Since then until both of the store and wait counters come to indicate "0" and the processing of the StoreFence instruction accordingly ends, the memory access control unit 14 repeats the same operation.

Further, if an instruction detected by the memory access control unit 14 is a Load instruction (NO at the step S21, NO at the step S23, and YES at a step S26), the memory access control unit 14 issues the Load instruction to the processor-to-memory network 2 (step S25). By that, the processing of the Load instruction ends. Further, if no Load instruction is detected in the step S26, the memory access control unit 14 declares that there is no detected instruction and ends the process.

The information processing device 10 according to the present exemplary embodiment achieves such effects as described below.

It becomes possible to realize a method for guaranteeing global visibility of an invalidation request to an Acquire side processor when offering a guarantee of memory order.

It is because an invalidation process at the Acquire side processor having received the invalidation request is completed before execution of a LoadFence instruction.

In the present exemplary embodiment, because a LoadFence instruction and an invalidation request are applied to only processors and memories which are concerned (order is guaranteed by performing the processes at a temporally assured timing, instead of guaranteeing the order by exchanging all information between processors and memories, as is done in Patent Literature 1), (a) it becomes unlikely that a state of "waiting for even an invalidation request which essentially has no relation to the synchronization process" like that in Patent Literature 1 occurs. Also, (b) load on the processor-to-memory network becomes lower than in Patent Literature 1.

Second Exemplary Embodiment

Next, a second exemplary embodiment for implementing the present invention will be described in detail, with reference to a drawing.

Figure 7:
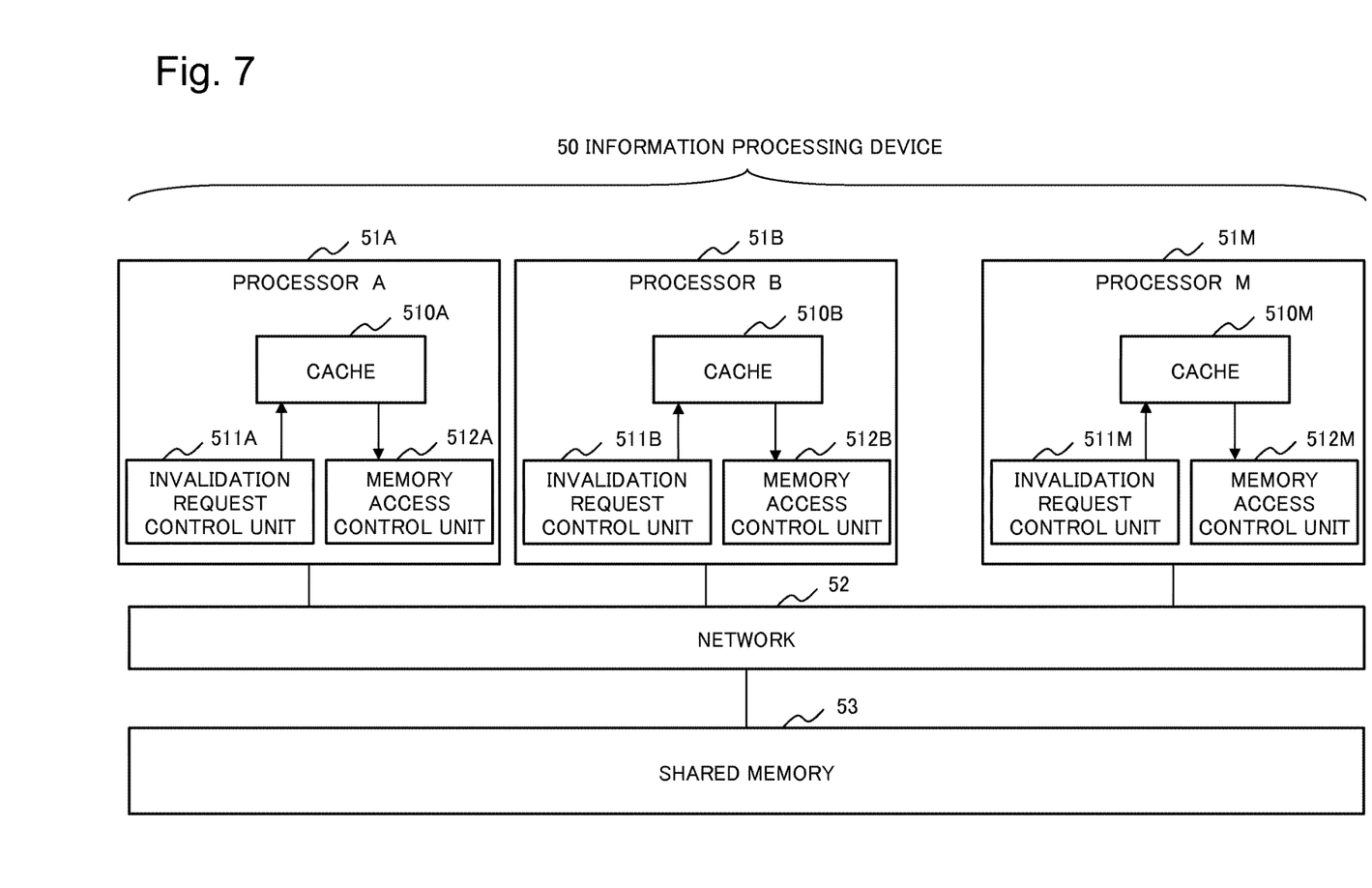
FIG. 7 is a block diagram showing an example of a configuration of an information processing device according to a second exemplary embodiment of the present invention.

FIG. 7 is a block diagram showing an example of a configuration of an information processing device 50 according to the second exemplary embodiment.

The information processing device 50 comprises processors 51 (51A to 51M), a shared memory 53, and a processor-to-memory network 52 for connecting the processors 51 with the shared memory 53. Here, the rule of assigning a reference sign to each constituent element is the same as that in the first exemplary embodiment.

Each of the processors 51 includes a cash 510, a memory access control unit 512 for controlling access from the processor 51 to the shared memory 53, and an invalidation request control unit 511 for performing a process of invalidating the cache 510 according to an invalidation request from the shared memory 53. The following description will be given on the assumption that a processor on the Release side is the processor 51A and the one on the Acquire side is the processor 51B. However, it is not the sole case, but the number of processors on the Acquire side may be two or more.

Based on writing of data from the Release side processor 51A intending to write data, the shared memory 53 sends an invalidation request for a cache 510B to an invalidation request control unit 511B of the Acquire side processor 51B to read data.

A memory access control unit 511A of the Release side processor 51A issues a StoreFence instruction for requesting a guarantee of completing the invalidation of the cache 510B in the Acquire side processor 51B. The StoreFence instruction is sent out to the network 52.

In response to the StoreFence instruction, the memory access control unit 512 of the Acquire side processor 51B issues a LoadFence instruction for guaranteeing completion of the invalidation of the cache 510B in accordance with the invalidation request from the shared memory 53, after completing a process for the cache invalidation. The LoadFence instruction is sent out to the network 52.

The information processing device 50 according to the present exemplary embodiment achieves such an effect as described below.

It becomes possible to realize a method for guaranteeing global visibility of an invalidation request to an Acquire side processor when offering a guarantee of memory order.

It is because an invalidation process at the Acquire side processor having received the invalidation request is completed before execution of a LoadFence instruction.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An information processing device comprising:
a plurality of processors including an Acquire side processor intending to read data and a Release side processor intending to write data; and
a shared memory,
the Acquire side processor and the Release side processor including
a cache,
a memory access control unit configured to control access from the processors to the shared memory, the memory access control unit in the Release side processor, configured to comprise a store counter whose value is increased if a Store instruction is issued to the shared memory, and is decreased if an acknowledgement response indicating correct reception of the Store instruction is received from the shared memory, and a wait counter whose value is set at a value representing a predetermined time if the store counter has come to indicate 0, the wait counter decreasing the value at every predetermined interval, and the predetermined time being determined such that, compared to a time since the shared memory's sending an invalidation request until the Acquire side processor's completing a process for invalidating the cache, longer is a time taken totally by the shared memory's sending the acknowledgement response in response to the Store instruction from the Release side processor, the Release side processor's writing a flag into the shared memory the predetermined time later, and the Acquire side processor's reading the flag, and
an invalidation request control unit configured to perform the process for invalidating the cache in accordance with the invalidation request from the shared memory,
wherein,
the shared memory sends the invalidation request to the Acquire side processor for invalidating the cache in the Acquire side processor, based on writing of data by the Release side processor,
the memory access control unit in the Release side processor issues StoreFence instruction if both of the store counter and the wait counter have come to indicate 0, and
the memory access control unit in the Acquire side processor issues a LoadFence instruction in response to the StoreFence instruction for guaranteeing completion of a cache invalidation in accordance with the invalidation request from the shared memory after completing the process for the cache invalidation.

2. The information processing device according to claim 1, wherein:

the shared memory consists of a plurality of banks; and
each one of the plurality of banks comprises
a memory main body, and
a directory unit configured to send the invalidation request in response to writing of data into the memory main body.

3. A memory order guarantee method comprising:
based on writing of data from a Release side processor intending to write data, sending, to an Acquire side processor intending to read data, an invalidation request for its cache, using a shared memory;
issuing a StoreFence instruction, using the Release side processor, if both of a store counter and a wait counter have come to indicate 0;
increasing the value of the store counter if a Store instruction is issued to the shared memory, and decreasing if an acknowledgement response indicating correct reception of the Store instruction is received from the shared memory;
setting a value of the wait counter, the value representing a predetermined time if the store counter has come to indicate 0, and decreasing the value at the predetermined time, the predetermined time being determined such that, compared to a time since the shared memory's sending the invalidation request until the Acquire side processor's completing a process for invalidating the cache, longer is a time taken totally by the shared memory's sending the acknowledgement response in response to the Store instruction from the Release side processor, the Release side processor's writing a flag into the shared memory;
the predetermined time later, the Acquire side processor's reading the flag; and
in relation to the StoreFence instruction, by the Acquire side processor, issuing a LoadFence instruction for guaranteeing completion of a cache invalidation in accordance with the invalidation request from the shared memory, after completing the process for the cache invalidation.

4. The memory order guarantee method according to claim 3, wherein:
the shared memory consists of a plurality of banks; and
each one of the plurality of banks sends the invalidation request in response to writing of data into its memory main body.

5. A readable non-volatile recording medium storing a program for causing a computer to execute:
based on writing of data from a Release side processor intending to write data, sending, to an Acquire side processor intending to read data, an invalidation request for its cache, using a shared memory;
issuing a StoreFence instruction, using the Release side processor, if both of a store counter and a wait counter have come to indicate 0;
increasing the value of the store counter if a Store instruction is issued to the shared memory, and decreasing if an acknowledgement response indicating correct reception of the Store instruction is received from the shared memory;
setting a value of the wait counter, the value representing a predetermined time if the store counter has come to indicate 0, and decreasing the value at the predetermined time, the predetermined time being determined such that, compared to a time since the shared memory's sending the invalidation request until the Acquire side processor's completing the process for invalidating the cache, longer is a time taken totally by the shared memory's sending the acknowledgement response in response to the Store instruction from the Release side processor, the Release side processor's writing a flag into the shared memory
the predetermined time later, and the Acquire side processor's reading the flag; and
in relation to the StoreFence instruction, by the Acquire side processor, issuing a LoadFence instruction for guaranteeing completion of the cache invalidation in accordance with the invalidation request from the shared memory, after completing a process for the cache invalidation.

6. The readable non-volatile recording medium storing a program according to claim 5, wherein:
the shared memory consists of a plurality of banks; and
the program causes the computer to execute a process in which each one of the plurality of banks sends the invalidation request in response to writing of data into its memory main body.

* * * * *